United States Patent
Kudou et al.

(10) Patent No.: US 8,729,420 B2
(45) Date of Patent: May 20, 2014

(54) MACHINING CONDITION ADJUSTING DEVICE FOR ELECTRIC DISCHARGE MACHINE

(75) Inventors: Takehiro Kudou, Yamanashi (JP); Kaoru Hiraga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 117 days.

(21) Appl. No.: 13/549,432

(22) Filed: Jul. 14, 2012

(65) Prior Publication Data

US 2013/0112658 A1    May 9, 2013

(30) Foreign Application Priority Data

Nov. 4, 2011    (JP) ................................. 2011-242762

(51) Int. Cl.
     *B23H 7/20*      (2006.01)

(52) U.S. Cl.
     USPC ........................................ 219/69.13; 700/162

(58) Field of Classification Search
     CPC ........... B23H 7/20; B23H 1/024; B23H 7/065
     USPC ......... 700/173, 162; 219/69.16, 69.17, 69.18, 219/69.12, 69.13
     See application file for complete search history.

(56) References Cited

U.S. PATENT DOCUMENTS

| | | | | |
|---|---|---|---|---|
| 3,705,286 A | * | 12/1972 | Kondo et al. ............... | 219/69.13 |
| 3,873,816 A | * | 3/1975 | Takeyama et al. ............ | 700/173 |
| 4,335,436 A | * | 6/1982 | Inoue ............................ | 700/162 |
| 4,970,363 A | * | 11/1990 | Obara ......................... | 219/69.12 |
| 5,408,064 A | * | 4/1995 | Takahara ................... | 219/69.13 |
| 6,784,395 B2 | * | 8/2004 | Sendai et al. .............. | 219/69.13 |
| 2007/0051701 A1 | * | 3/2007 | Ogata et al. ................ | 219/69.17 |

FOREIGN PATENT DOCUMENTS

| | | | |
|---|---|---|---|
| EP | 0505570 A1 | | 9/1992 |
| JP | 2153476 A | | 6/1990 |
| JP | 2-262915 A | | 10/1990 |
| JP | 4-122524 A | | 4/1992 |
| JP | 06-091435 A | * | 4/1994 |
| JP | 2008-036812 A | * | 2/2008 |
| JP | 2008-036812 A | | 2/2008 |

OTHER PUBLICATIONS

Machine translation of Japan Patent No. 6-091435, Dec. 2013.*
Machine translation of Japan Patent No. 2008-036,812, Dec. 2013.*
Office Action corresponding to JP 2011-242762, dated Jan. 15, 2013.

* cited by examiner

*Primary Examiner* — Geoffrey S Evans
(74) *Attorney, Agent, or Firm* — Lowe Hauptman & Ham, LLP

(57) ABSTRACT

Machining state information is acquired for each predetermined period by performing test machining by an electric discharge machine, and the acquired machining state information is compared with reference machining state information, whereby whether a machining state is satisfactory or not is determined. If the machining state is determined to be unsatisfactory, set items of a machining condition are adjusted. Thereafter, test machining is actually performed again, and the machining condition is adjusted by changing the set items if the machining state is determined again to be unsatisfactory. Thus, the acquisition of the machining state information, determination of the machining state, and adjustment of the machining condition are repeated so that satisfactory machining is finally determined.

3 Claims, 11 Drawing Sheets

MACHINING CONDITION ADJUSTING DEVICE FOR ELECTRIC DISCHARGE MACHINE

RELATED APPLICATIONS

The present application is based on, and claims priority from, Japanese Application Number 2011-242762, filed Nov. 4, 2011, the disclosure of which is hereby incorporated by reference herein in its entirety.

BACKGROUND OF THE INVENTION

1. Field of the Invention

The present invention relates to a machining condition adjusting device for electric discharge machining.

2. Description of the Related Art

A processing machine for industrial applications performs a machining process such that a desired final shape is obtained by applying a physical, electrical, or chemical action to a metal workpiece of, for example, tool steel, thereby gradually changing the shape of the workpiece. In general, the state of this machining process can be varied by changing control parameters called a machining condition.

The result of machining depends on the appropriateness of a selected machining condition. It is actually difficult, however, to instantaneously select an appropriate condition that meets required machining specifications. In electric discharge machining, for example, it is essential to select such a machining condition that the machining speed is high and an abnormal machining state can be avoided. The machining condition stated herein comprises a plurality of control parameters, each of which is selected from varying values.

Normally, an operator settles an optimum machining condition of an electric discharge machine by frequently repeating operations including monitoring machining states, such as voltage, current, short-circuiting, disconnection, machining speed, etc., during machining on the machine side, adjusting the used machining condition based on the result of the machining and a machining state during machining, and performing machining again under the adjusted machining condition.

A conventional determination process for a machining condition will be described with reference to the flowchart of FIG. 13.

First, information indicative of a target machining state (non-occurrence of disconnection/short-circuiting, target machining speed, etc.) is registered as required machining information (Step SA01). Then, a machining condition to be used for test machining is set (Step SA02). Here the machining condition is a combination of set values of machining voltage, machining speed, current, downtime, etc., during machining.

Then, test machining is started under the machining condition set in Step SA02 (Step SA03). Thereupon, the operator monitors and records the machining state during machining on the machine side until the end of the machining, or a machining state during machining output from an electric discharge controller is automatically recorded (Step SA04).

After the end of the test machining (Step SA05), whether machining is satisfactory or not is determined by the result of the machining and the machining state during machining recorded automatically or by the operator (Step SA06). If the machining is then determined to be unsatisfactory, the machining condition used for the test machining is adjusted (Step SA07), and the adjusted machining condition is regarded as the one to be used for the test machining. Thereupon, the program returns to Step SA02, in which the machining condition for the test machining is reset. Thereafter, the processing of Steps SA03, SA04, SA05, SA06, SA07 and SA02 is repeated so that the machining is determined to be satisfactory in Step SA06. A simple straight-line shape and a zigzag shape shown in FIG. 14 are used for the test machining.

However, the method of this type is inefficient, requiring much labor. On the other hand, Japanese Patent Application Laid-Open No. 2-153476 discloses adaptive control such that optimum machining is performed by determining the machining state during machining and varying the machining condition.

According to the method disclosed in Japanese Patent Application Laid-Open No. 2-153476, however, the machining condition is continually varied. If a single machine is used to repeat the same machining, therefore, an optimum machining condition for each machining cycle varies, so that the result of the machining also varies, inevitably.

SUMMARY OF THE INVENTION

Accordingly, in consideration of the above problems of the prior art, the object of the present invention is to provide a machining condition adjusting device configured to settle an optimum machining condition by automatically monitoring machining states and adjusting a machining condition based on a machining state during machining.

The present invention relates to a machining condition adjusting device for an electric discharge machine configured to machine a workpiece according to a set machining condition. The machining condition adjusting device comprises: a machining state information acquiring unit that acquires a plurality of signals or physical quantities for determining whether a machining state is satisfactory or not, as machining state information, for each predetermined period; a required machining state storage unit that stores reference values of the signals or physical quantities as reference machining state information; a machining state determination unit that compares the machining state information acquired by the machining state information acquiring unit with the reference machining state information stored by the required machining state storage unit, thereby determining whether the machining state is satisfactory or not, and to determine the type of unsatisfactory machining if the machining state is determined to be unsatisfactory; a machining condition adjustment method storage unit stored with, as a method of adjusting the machining condition to be performed to cancel the unsatisfactory machining if the machining state is determined to be unsatisfactory by the machining state determination unit, priority of the type of the unsatisfactory machining to be subjected to the machining condition adjustment, priority of set items of the machining condition to be adjusted according to the type of the unsatisfactory machining, and adjusted values of the set items; and a machining condition adjustment unit that adjusts the set items of the machining condition based on the machining condition adjustment method if the unsatisfactory machining is determined by the machining state determination unit. The machining condition is adjusted by changing the set items to be adjusted according to the priority of the set items if the same unsatisfactory machining is determined again by the machining state determination unit when machining is performed after the machining condition adjustment, and the acquisition of the information by the machining state information acquiring unit, determination by the machining state determination unit, and adjustment by the machining condition adjustment unit are repeatedly performed so that satisfactory machining is determined by the machining state determination unit.

The machining condition adjustment method storage unit may be configured to allow addition of the type of unsatisfactory machining and the set items of the machining condition to be adjusted.

The machining condition adjustment method storage unit may be configured to allow change of the priority of the type of unsatisfactory machining to adjust the machining condition for canceling the unsatisfactory machining, the priority of the set items of the machining condition to be adjusted according to the type of the unsatisfactory machining, and the adjusted values of the set items.

According to the present invention, there can be provided a machining condition adjusting device for an electric discharge machine, configured so that the best machining condition can be achieved by determining whether a machining is satisfactory or not by a machining state obtained from the discharge machine during test machining, adjusting the machining condition in case of unsatisfactory machining, based on a machining state during machining and the determination as to whether machining is satisfactory or not, and automatically repeating the test machining so that the machining becomes satisfactory, based on the adjusted machining condition.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

<Determination Process for Machining Condition>

Figure 1:
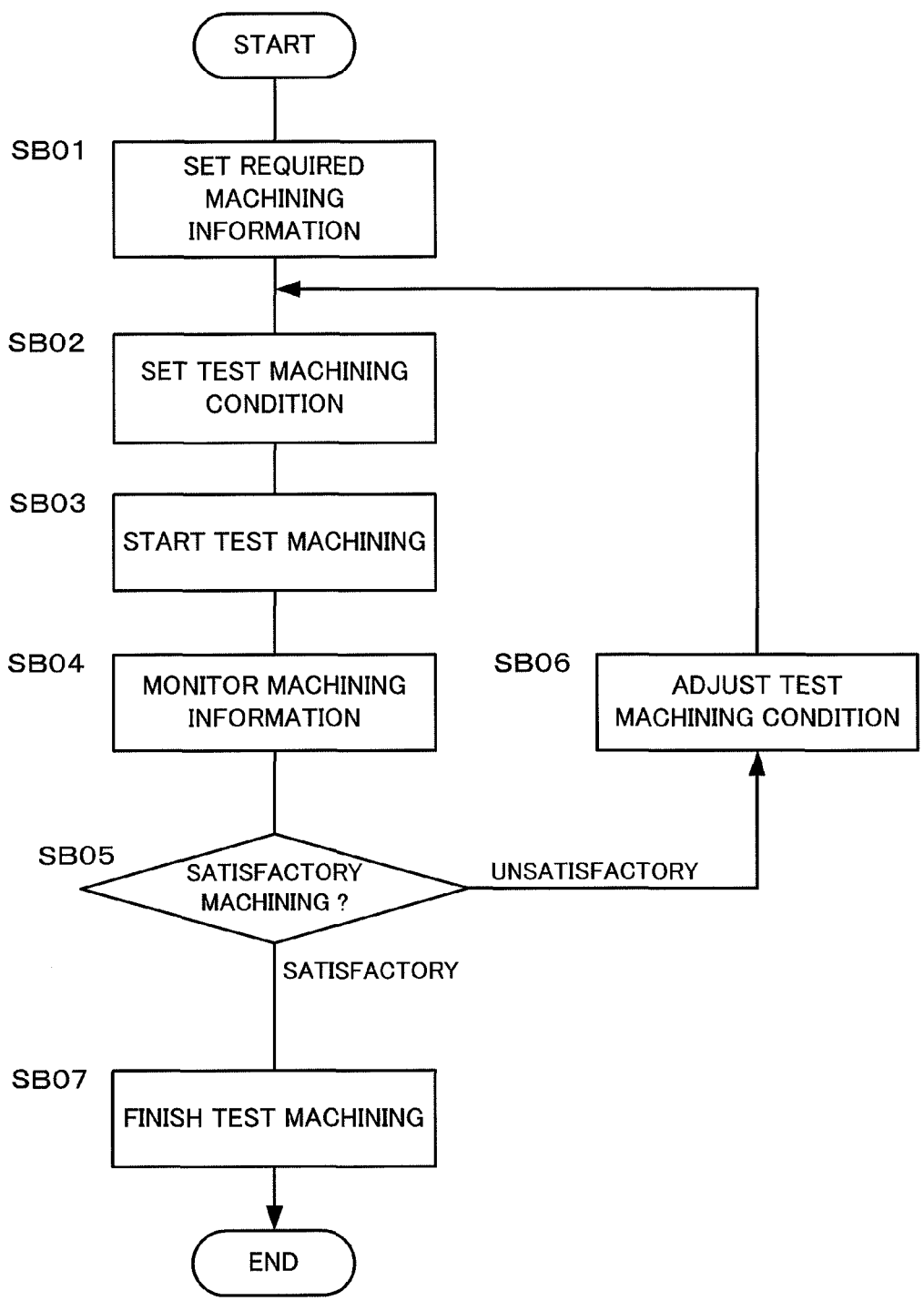
FIG. 1 is a flowchart illustrating a determination process for a machining condition performed by a machining condition adjusting device for an electric discharge machine according to the present invention.

A determination process for a machining condition performed by a machining condition adjusting device for an electric discharge machine according to the present invention will be described with reference to the flowchart of FIG. 1. The following is a sequential description of various steps of operation.

[Step SB01] Information indicative of a target machining state (indicative of non-occurrence of disconnection/short-circuiting, target machining speed, etc.) is registered as required machining information.

[Step SB02] A machining condition to be used for test machining is set.

[Step SB03] Test machining is started under the test machining condition set in Step SB02.

[Step SB04] The machining state during the test machining is automatically monitored from start to end.

[Step SB05] The machining state during the test machining is evaluated in comparison with the machining state of the required machining information, whereby whether the machining is satisfactory or not is checked.

[Step SB06] If it is determined in Step SB05 that the machining is unsatisfactory, the machining condition used in the test machining is automatically adjusted.

[Step SB07] End processing for the test machining is performed such that power supply for electric discharge is turned off, for example.

In the determination process for the machining condition of the present invention, as described above, Steps SB02 to SB06 are repeated so that the machining becomes satisfactory. By performing this process, the test machining is automatically repeated so that the machining becomes satisfactory, whereupon the best machining condition can be obtained.

<Determination as to Whether Machining is Satisfactory or Not>

A method of determining whether machining is satisfactory or not will be described with reference to the flowchart of FIG. 2. The following is a sequential description of various steps of operation. In this illustrative example, the machining state indicative of unsatisfactory machining is based on the occurrence or non-occurrence of disconnection/short-circuiting and machining speed.

[Step SC01] The machining state required for making a machining satisfactory is compared with the machining state during machining. If disconnection or short-circuiting is caused (YES), the program proceeds to Step SC02. If not (NO), the program proceeds to Step SC03.

[Step SC02] It is determined whether or not the caused trouble is disconnection. If the trouble is disconnection (YES), the program proceeds to Step SC04. If not (NO), the program proceeds to Step SC05.

[Step SC03] Variation of the machining state during machining relative to the machining state required for making a machining satisfactory is determined on condition that neither disconnection nor short-circuiting is caused. If a certain tolerance is then exceeded by the machining speed during machining relative to the required machining speed (YES), the program proceeds to Step S06. If not (NO), the program proceeds to Step S07.

[Step SC04] Decision value "1" for unsatisfactory machining is set, whereupon the processing ends.

[Step SC05] Decision value "2" for unsatisfactory machining is set, whereupon the processing ends.

[Step SC06] Decision value "3" for unsatisfactory machining is set, whereupon the processing ends.

[Step SC07] Decision value "0" for unsatisfactory machining is set, whereupon the processing ends.

Figure 2:
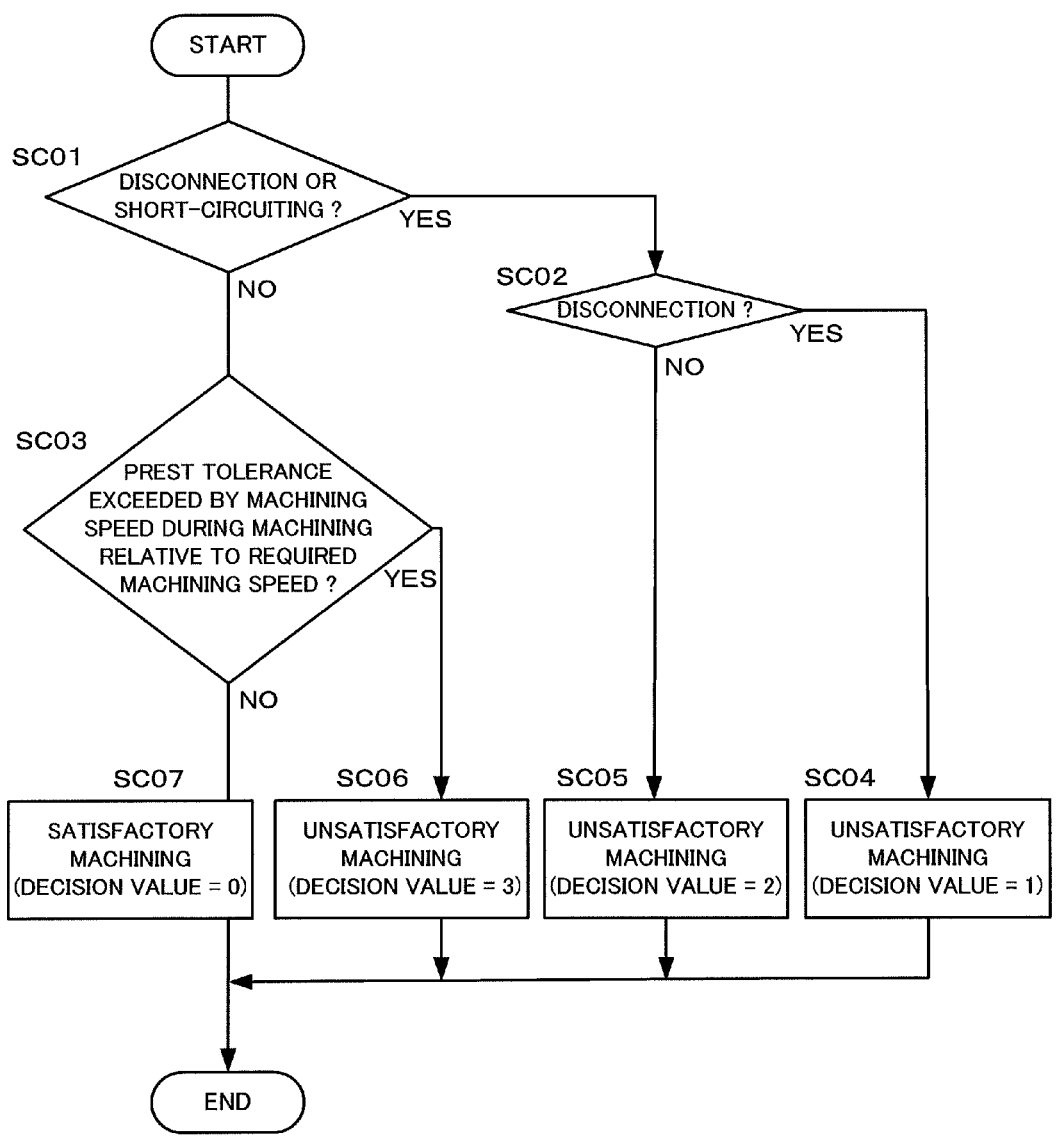
FIG. 2 is a flowchart illustrating a method of determining whether machining is satisfactory or not.

If the decision value obtained in the determination as to whether machining is satisfactory or not, shown in FIG. 2, indicates unsatisfactory machining (decision value=1 to 3 indicates unsatisfactory machining in the processing of FIG. 2), the machining condition used in the test machining is adjusted.

<Adjustment of Machining Condition>

Figure 3:
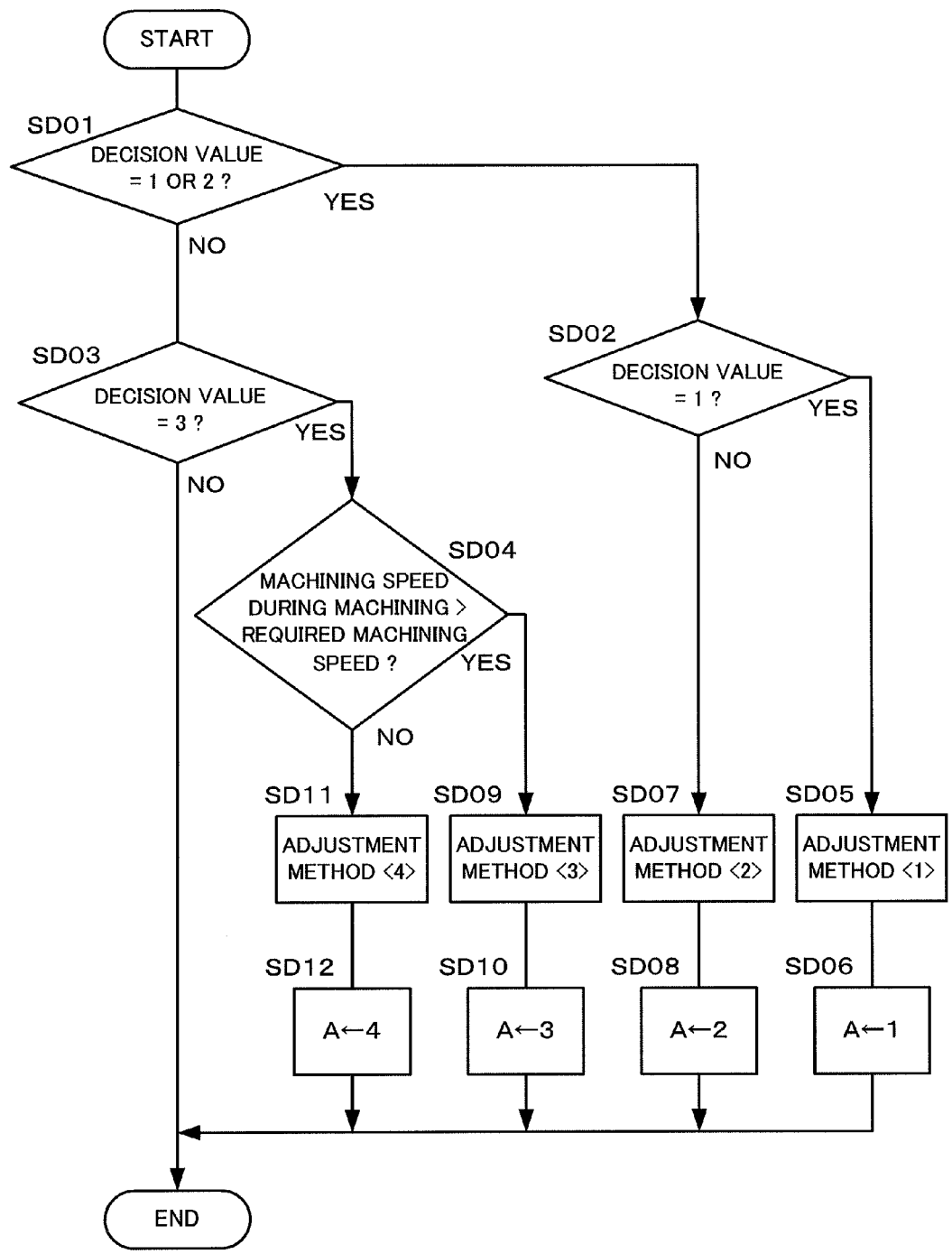
FIG. 3 is a flowchart illustrating a method of adjusting the machining condition.

A method of adjusting a machining condition will be described with reference to the flowchart of FIG. 3. The following is a sequential description of various steps of operation. In this illustrative example, as in the case of the processing of FIG. 2 (determination as to whether machining is satisfactory or not), the machining state indicative of unsatisfactory machining is based on the occurrence or non-occurrence of disconnection/short-circuiting and machining speed.

[Step SD01] It is determined whether or not the decision value is 1 or 2 (whether machining is subjected to disconnection or short-circuiting). If the decision value is 1 or 2 (YES), the program proceeds to Step SD02. If not (NO), the program proceeds to Step SD03.

(YES), the program proceeds to Step SD09. If not (NO), the program proceeds to Step SD11.

[Step SD05] The adjustment method <1> is performed.

[Step SD06] The value of an index A indicative of the performed adjustment method is set to 1, whereupon this processing ends.

[Step SD07] The adjustment method <2> is performed.

[Step SD08] The value of the index A indicative of the performed adjustment method is set to 2, whereupon this processing ends.

[Step SD09] The adjustment method <3> is performed.

[Step SD10] The value of the index A indicative of the performed adjustment method is set to 3, whereupon this processing ends.

[Step SD11] The adjustment method <4> is performed.

[Step SD12] The value of the index A indicative of the performed adjustment method is set to 4, whereupon this processing ends.

In this way, the machining condition is adjusted based on the adjustment method corresponding to each machining state indicative of unsatisfactory machining.

<Adjustment Method for Machining Condition>

For the adjustment of the machining condition, the priority and an adjusted value and its increase and decrease are set in the manner shown in the following Table 1, for each set item of the machining condition to be adjusted for each machining state indicative of unsatisfactory machining. Set items of the machining condition are adjusted according to Table 1. Table 1 shows only those cases where unsatisfactory machining is determined by a single piece of machining state information. Alternatively, however, the state of unsatisfactory machining may be determined by a combination of two pieces of machining state information. The priority of the set items is given by [1], [2], [3], . . . in the descending order. The highest priority is given to level [1]. The adjusted value and its increase and decrease are given by +2, −1, etc., the plus and minus signs (+ and −) indicating an increase and decrease, respectively.

TABLE 1

| Set items to be adjusted | Machining states indicative of unsatisfactory machining | | | |
|---|---|---|---|---|
| | Disconnection Adjustment method <1> | Short-circuiting Adjustment method <2> | Machining speed during machining > Machining speed required Adjustment method <3> | Machining speed during machining < Machining speed required (Adjustment method <4>) |
| Servo voltage | — | [1] +1 | — | — |
| Length of each discharge pulse | [2] +2 | — | [3] +1 | [3] −1 |
| Power of each discharge pulse | [1] −1 | — | [2] −1 | [2] +1 |
| | — | — | [1] −1 | [1] +1 |

[Step SD02] It is determined whether or not the decision value is 1. If the decision value is 1 (YES), the program proceeds to Step SD05. If not (NO), the program proceeds to Step SD07.

[Step SD03] It is determined whether or not the decision value is 3. If the decision value is 3 (YES), the program proceeds to Step SD04. If not (NO), this processing ends.

[Step SD04] It is determined whether or not the machining speed during machining is higher than the required machining speed. If the machining speed during machining is higher The following is a description of a specific example of the adjustment method for the machining condition.

Figure 4:
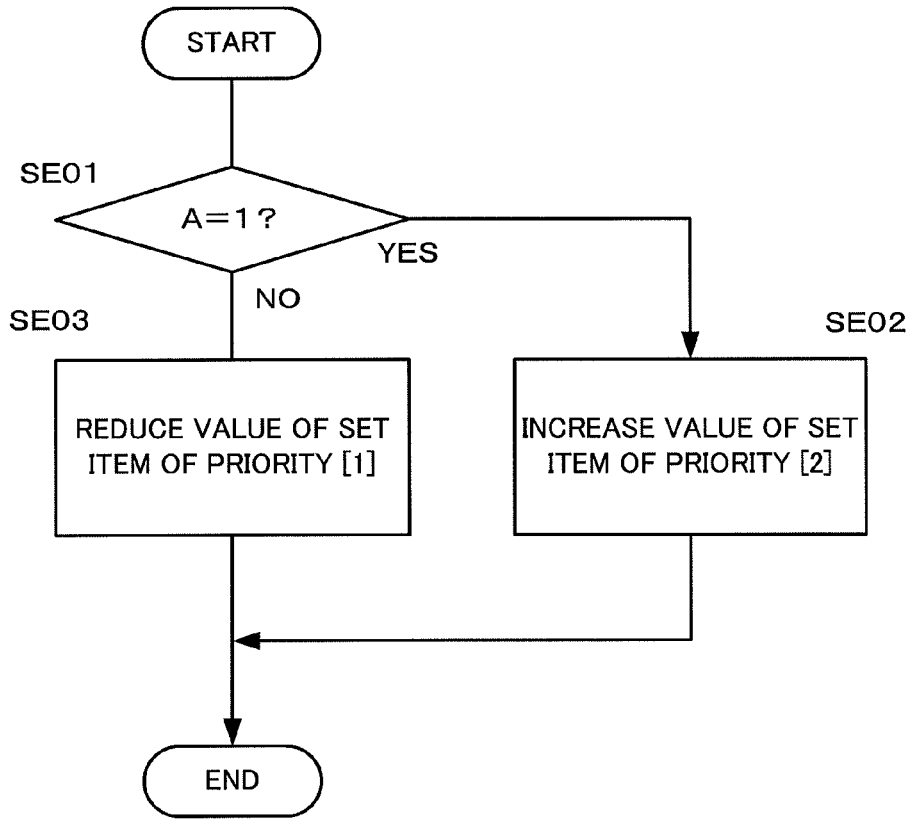
FIG. 4 is a flowchart illustrating an adjustment method <1> as a method of adjusting the machining condition for the case where a machining state indicative of unsatisfactory machining is "disconnection"

The adjustment method <1> is a method of adjusting the machining condition for the case where the machining state indicative of unsatisfactory machining is "disconnection". The adjustment method <1> will be described with reference to the flowchart of FIG. 4. The following is a sequential description of various steps of operation.

[Step SE01] It is determined whether or not the value of the index A of the performed adjustment method is 1. If the index value is 1 (YES), the program proceeds to Step SE02. If not (NO), the program proceeds to Step SE03.

[Step SE02] The value of the set item of priority [2] is increased, whereupon this processing ends.

[Step SE03] The value of the set item of priority [1] is reduced, whereupon this processing ends.

Figure 5:
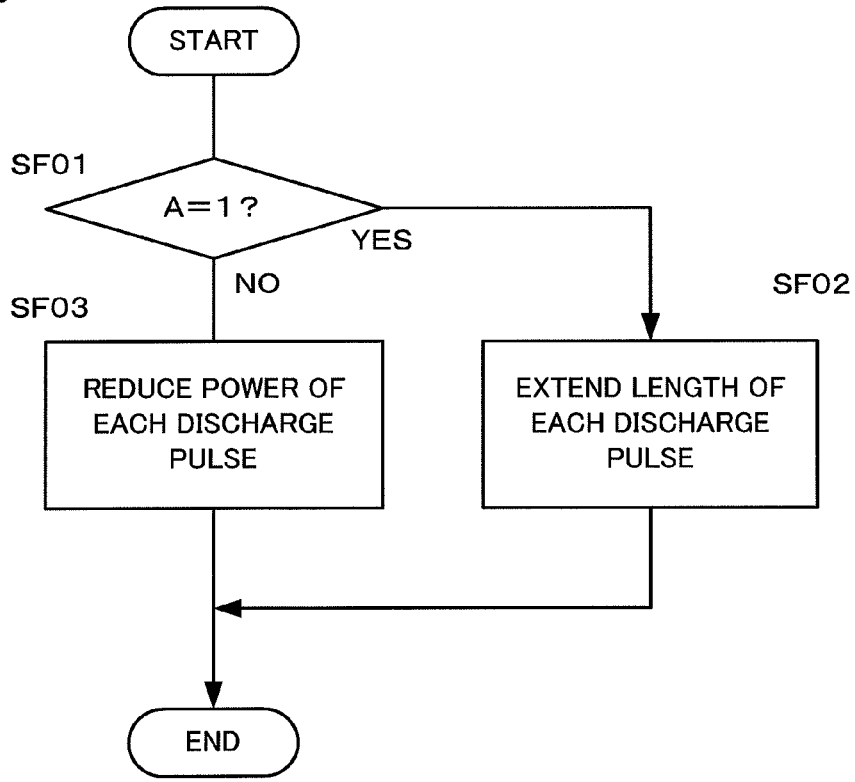
FIG. 5 is a flowchart illustrating processing for the adjustment method <1> reflective of the adjustment of the machining condition.

The occurrence of the disconnection is attributable to excessive power of each discharge pulse, so that the power should be reduced. As shown in Table 1, therefore, priority [1] is given to the power of each discharge pulse, and priority [2] is given to the length of each discharge pulse. The flowchart of FIG. 5 shows processing for the adjustment method <1> reflective of the adjustment of the machining condition. The following is a sequential description of various steps of operation.

[Step SF01] It is determined whether or not the value of the index A of the performed adjustment method is 1. If the index value is 1 (YES), the program proceeds to Step SF02. If not (NO), the program proceeds to Step SF03.

[Step SF02] The length of each discharge pulse is extended, whereupon this processing ends.

[Step SF03] The power of each discharge pulse is reduced, whereupon this processing ends.

Figure 6:
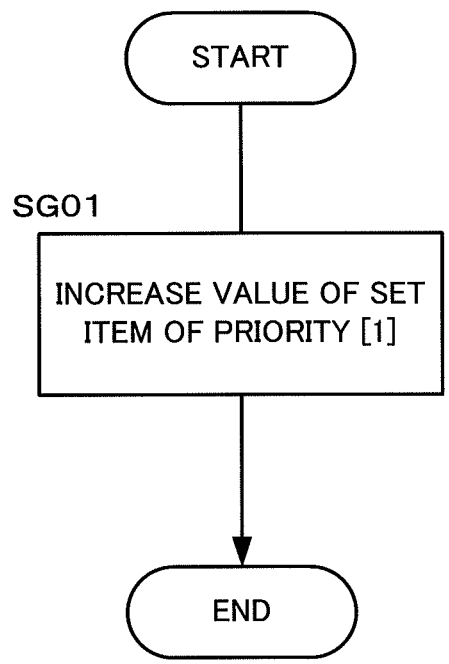
FIG. 6 is a flowchart illustrating an adjustment method <2> as a method of adjusting the machining condition for the case where the machining state indicative of unsatisfactory machining is "short-circuiting"

The adjustment method <2> is a method of adjusting the machining condition for the case where the machining state indicative of unsatisfactory machining is "short-circuiting". The adjustment method <2> will be described with reference to the flowchart of FIG. 6.

[Step SG01] The value of the set item of priority [1] is increased.

Figure 7:
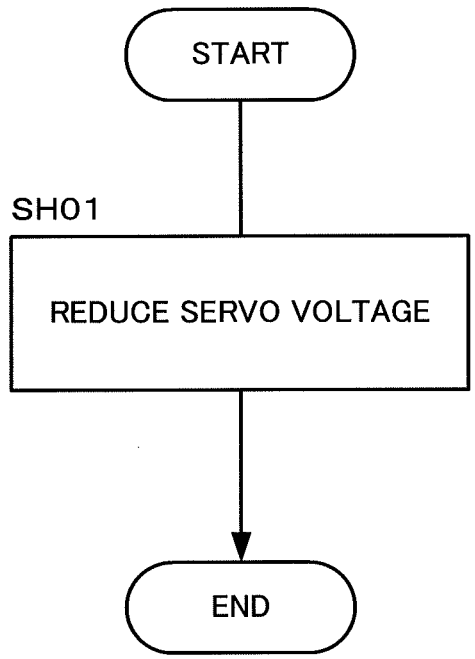
FIG. 7 is a flowchart illustrating processing for the adjustment method <2> reflective of the adjustment of the machining condition.

The occurrence of the short-circuiting is attributable to too high a servo voltage, so that the servo voltage should be reduced. As shown in Table 1, therefore, priority [1] is given to the servo voltage. The flowchart of FIG. 7 shows processing for the adjustment method <2> reflective of the adjustment of the machining condition.

[Step SH01] The servo voltage is reduced, whereupon this processing ends.

Figure 8:
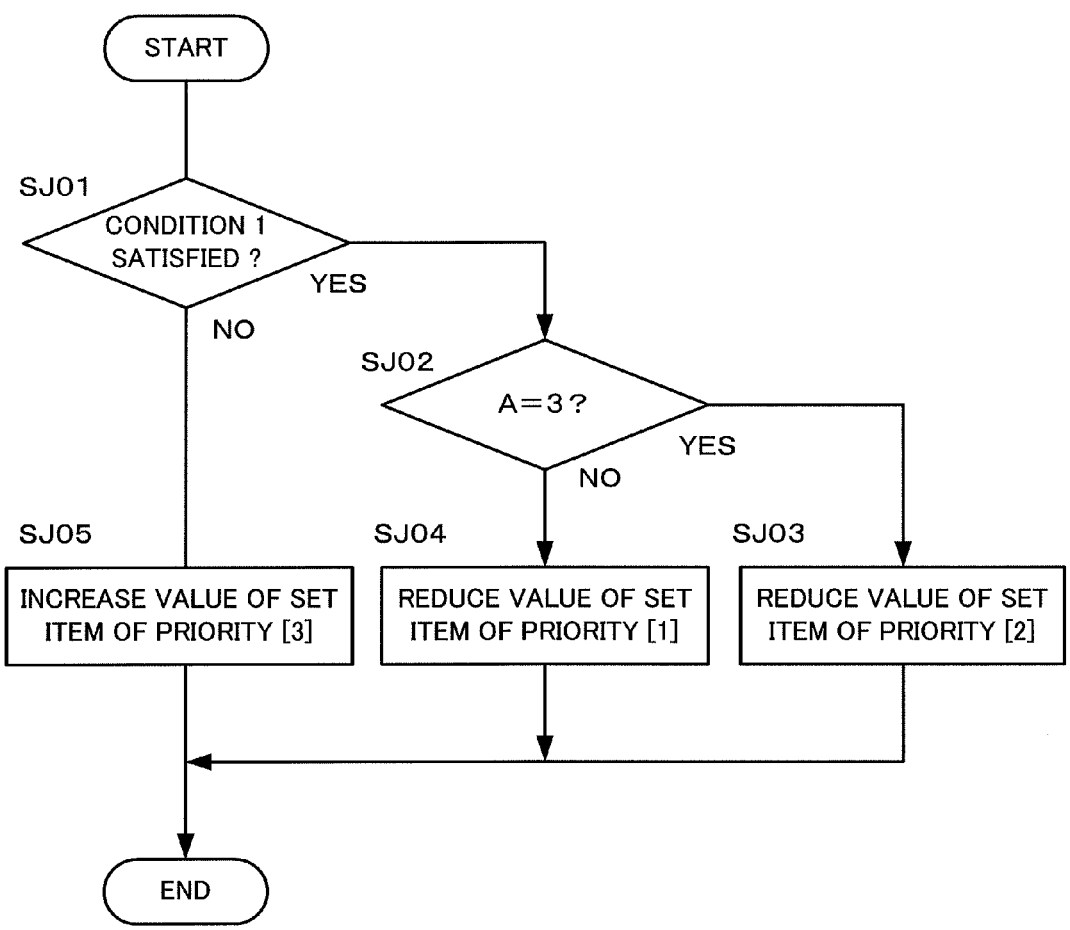
FIG. 8 is a flowchart illustrating an adjustment method <3> as a method of adjusting the machining condition for the case where the machining state indicative of unsatisfactory machining is "machining speed during machining>required machining speed"

The adjustment method <3> is a method of adjusting the machining condition for the case where the machining state indicative of unsatisfactory machining is "machining speed during machining>required machining speed". The adjustment method <3> is illustrated in the flowchart of FIG. 8. Various steps of operation will be sequentially described with reference to the flowchart of FIG. 8.

[Step SJ01] It is determined whether or not condition 1 is satisfied. If condition 1 is satisfied (YES), the program proceeds to Step SJ02. If not (NO), the program proceeds to Step SJ05.

[Step SJ02] It is determined whether or not the value of the index A of the performed adjustment method is 3. If the index value is 3 (YES), the program proceeds to Step SJ03. If not (NO), the program proceeds to Step SJ04.

[Step SJ03] The value of the set item of priority [2] is reduced, whereupon this processing ends.

[Step SJ04] The value of the set item of priority [1] is reduced, whereupon this processing ends.

[Step SJ05] The value of the set item of priority [3] is increased, whereupon this processing ends.

The reason why the machining speed during machining becomes higher than the required machining speed under a circumstance where neither disconnection nor short-circuiting occurs is that the power of each discharge pulse has not been fully reduced yet, as a result, the power has to be additionally reduced. If the power of each discharge pulse is suddenly reduced, as in the conventional case where disconnection or short-circuiting is caused, however, the machining speed during machining may possibly be reduced too much. Therefore, fine adjustment is made by reducing the feed speed gain first.

If the machining speed during machining becomes lower than 1.5 times the required machining speed, moreover, adjustment is made by extending the length of each discharge pulse.

Figure 9:
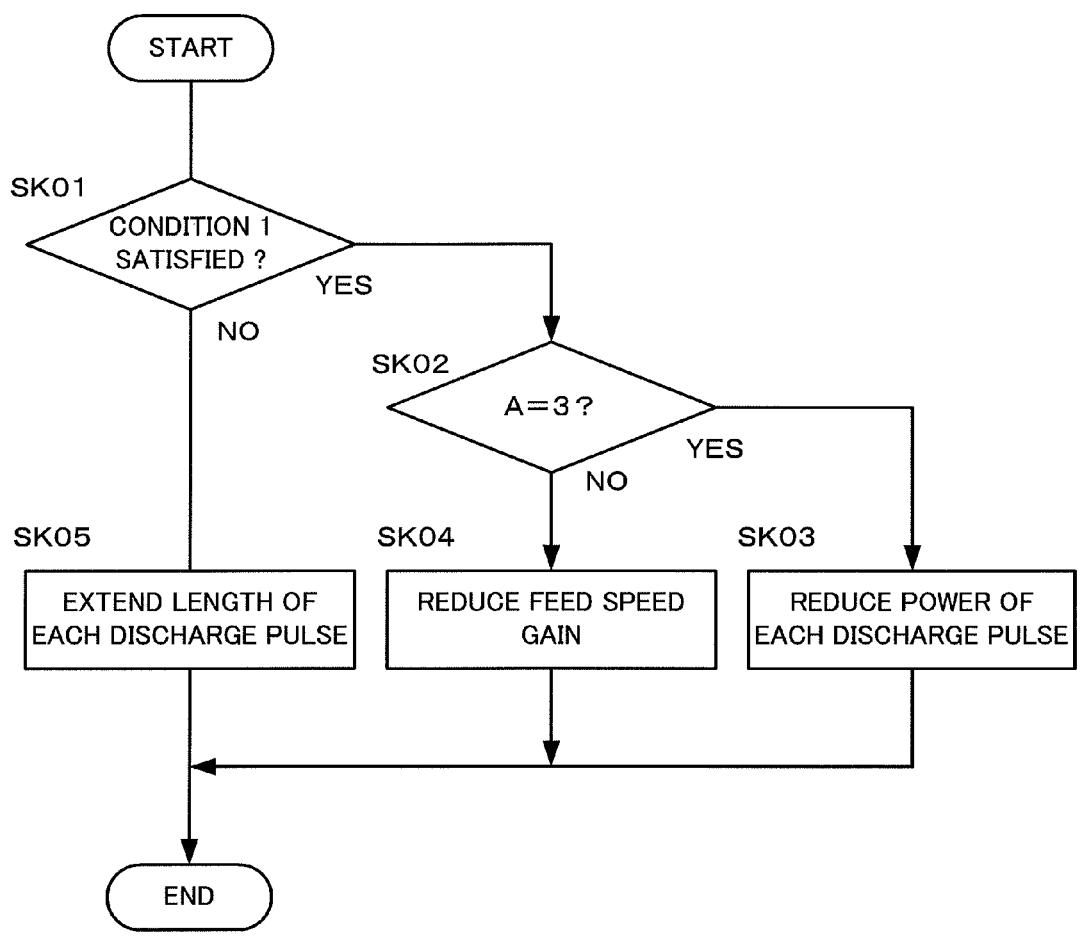
FIG. 9 is a flowchart illustrating processing for the adjustment method <3> reflective of the adjustment of the machining condition.

As shown in Table 1, therefore, priority [1] is given to the feed speed gain, priority [2] is given to the power of each discharge pulse, and priority [3] is given to the length of each discharge pulse. The flowchart of FIG. 9 shows processing for the adjustment method <3> reflective of the adjustment of the machining condition. The following is a sequential description of various steps of operation.

[Step SK01] It is determined whether or not condition 1 is satisfied. If condition 1 is satisfied (YES), the program proceeds to Step SK02. If not (NO), the program proceeds to Step SK05.

[Step SK02] It is determined whether or not the value of the index A of the performed adjustment method is 3. If the index value is 3 (YES), the program proceeds to Step SK03. If not (NO), the program proceeds to Step SK04.

[Step SK03] The power of each discharge pulse is reduced, whereupon this processing ends.

[Step SK04] The feed speed gain is reduced, whereupon this processing ends.

[Step SK05] The length of each discharge pulse is extended, whereupon this processing ends.

Figure 10:
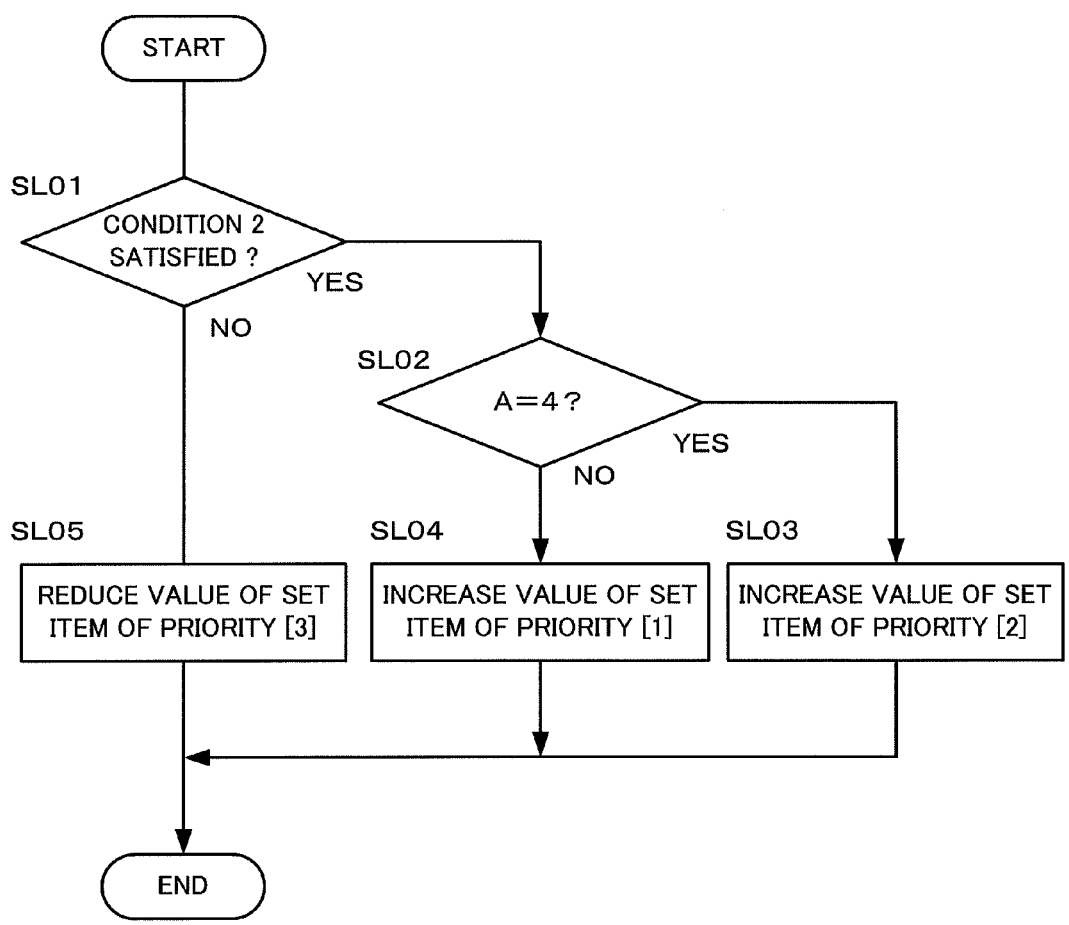
FIG. 10 is a flowchart illustrating an adjustment method <4> as a method of adjusting the machining condition for the case where the machining state indicative of unsatisfactory machining is "machining speed during machining<required machining speed"

The adjustment method <4> is a method of adjusting the machining condition for the case where the machining state indicative of unsatisfactory machining is "machining speed during machining<required machining speed". The adjustment method <4> will be described with reference to the flowchart of FIG. 10. The following is a sequential description of various steps of operation.

[Step SL01] It is determined whether or not condition 2 is satisfied. If condition 2 is satisfied (YES), the program proceeds to Step SL02. If not (NO), the program proceeds to Step SL05.

[Step SL02] It is determined whether or not the value of the index A of the performed adjustment method is 4. If the index value is 4 (YES), the program proceeds to Step SL03. If not (NO), the program proceeds to Step SL04.

[Step SL03] The value of the set item of priority [2] is increased, whereupon this processing ends.

[Step SL04] The value of the set item of priority [1] is increased, whereupon this processing ends.

[Step SL05] The value of the set item of priority [3] is reduced, whereupon this processing ends.

The reason why the machining speed during machining becomes lower than the required machining speed under a circumstance where neither disconnection nor short-circuiting occurs is that the power of each discharge pulse has not been fully increased yet, as a result, the power has to be additionally increased.

If the power of each discharge pulse is suddenly increased, as in the conventional case where disconnection or short-circuiting is caused, however, the machining speed during machining may possibly be increased too much. Therefore, fine adjustment is made by increasing the feed speed gain first.

If the machining speed during machining becomes higher than 0.5 times the required machining speed, moreover, adjustment is made by reducing the length of each discharge pulse.

Figure 11:
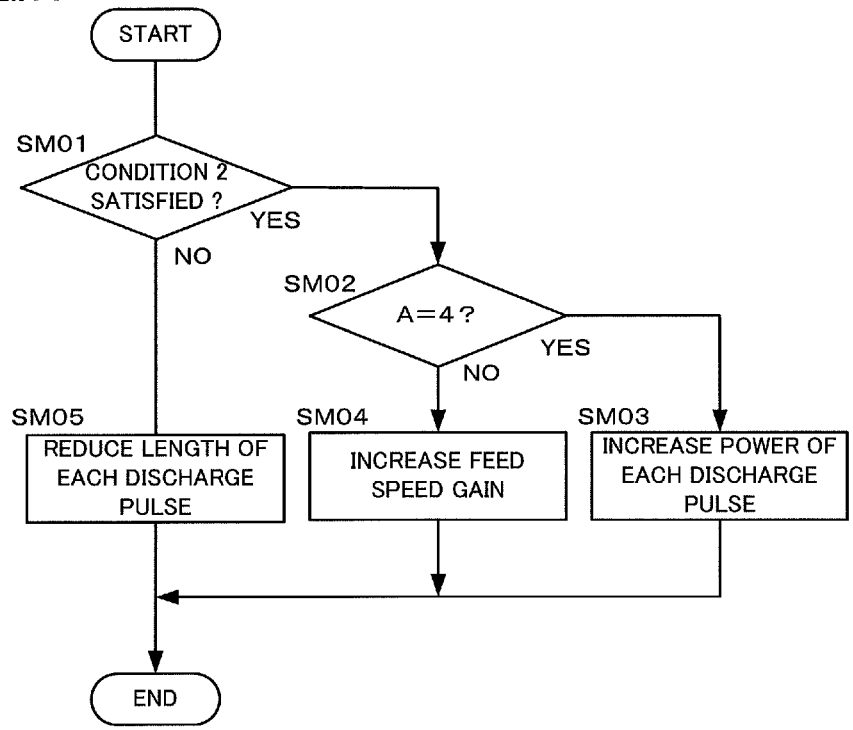
FIG. 11 is a flowchart illustrating processing for the adjustment method <4> reflective of the adjustment of the machining condition.

As shown in Table 1, therefore, priority [1] is given to the feed speed gain, priority [2] is given to the power of each discharge pulse, and priority [3] is given to the length of each discharge pulse. The flowchart of FIG. 11 shows processing for the adjustment method <3> reflective of the adjustment of the machining condition. The following is a sequential description of various steps of operation.

[Step SM01] It is determined whether or not condition 2 is satisfied. If condition 2 is satisfied (YES), the program proceeds to Step SM02. If not (NO), the program proceeds to Step SM05.

[Step SM02] It is determined whether or not the value of the index A of the performed adjustment method is 4. If the index value is 4 (YES), the program proceeds to Step SM03. If not (NO), the program proceeds to Step SM04.

[Step SM03] The power of each discharge pulse is increased, whereupon this processing ends.

[Step SM04] The feed speed gain is increased, whereupon this processing ends.

[Step SM05] The length of each discharge pulse is reduced, whereupon this processing ends.

In connection with the above examples, "disconnection", "short-circuiting", "machining speed during machining>required machining speed", and "machining speed during machining<required machining speed" have been described as unsatisfactory machining states. However, in addition to the above machining states, machining states for the determination of other unsatisfactory machining, such as a combination of the aforementioned machining states indicative of unsatisfactory machining, machining voltage, etc., can be added.

As for the set items of the machining condition to be adjusted for each machining state indicative of unsatisfactory machining, moreover, no-load voltage, working fluid volume, etc., may be added besides the servo voltage, length of each discharge pulse, power of each discharge pulse, and feed speed gain described in connection with the above examples.

Figure 12:
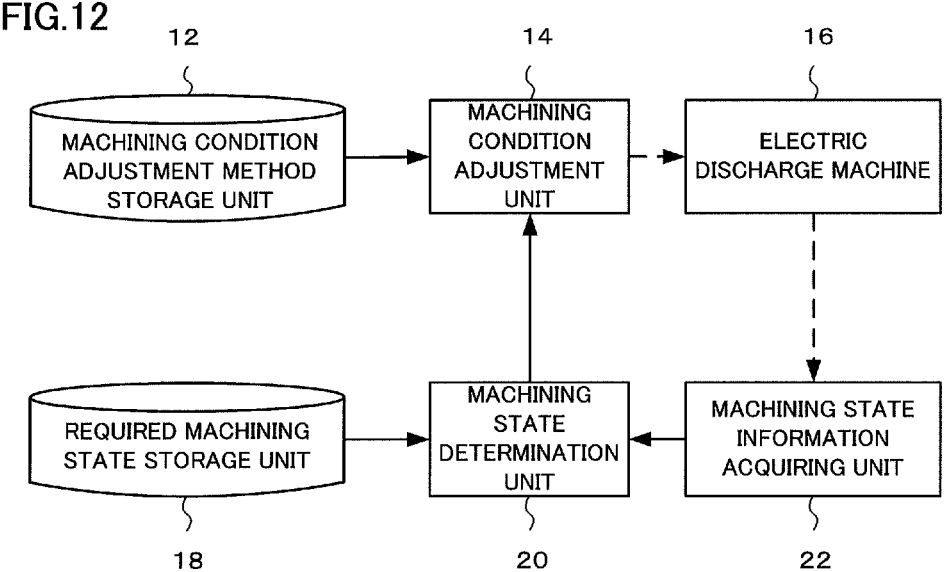
FIG. 12 is a block diagram illustrating one embodiment of the machining condition adjusting device for an electric discharge machine according to the present invention.
Figure 13:
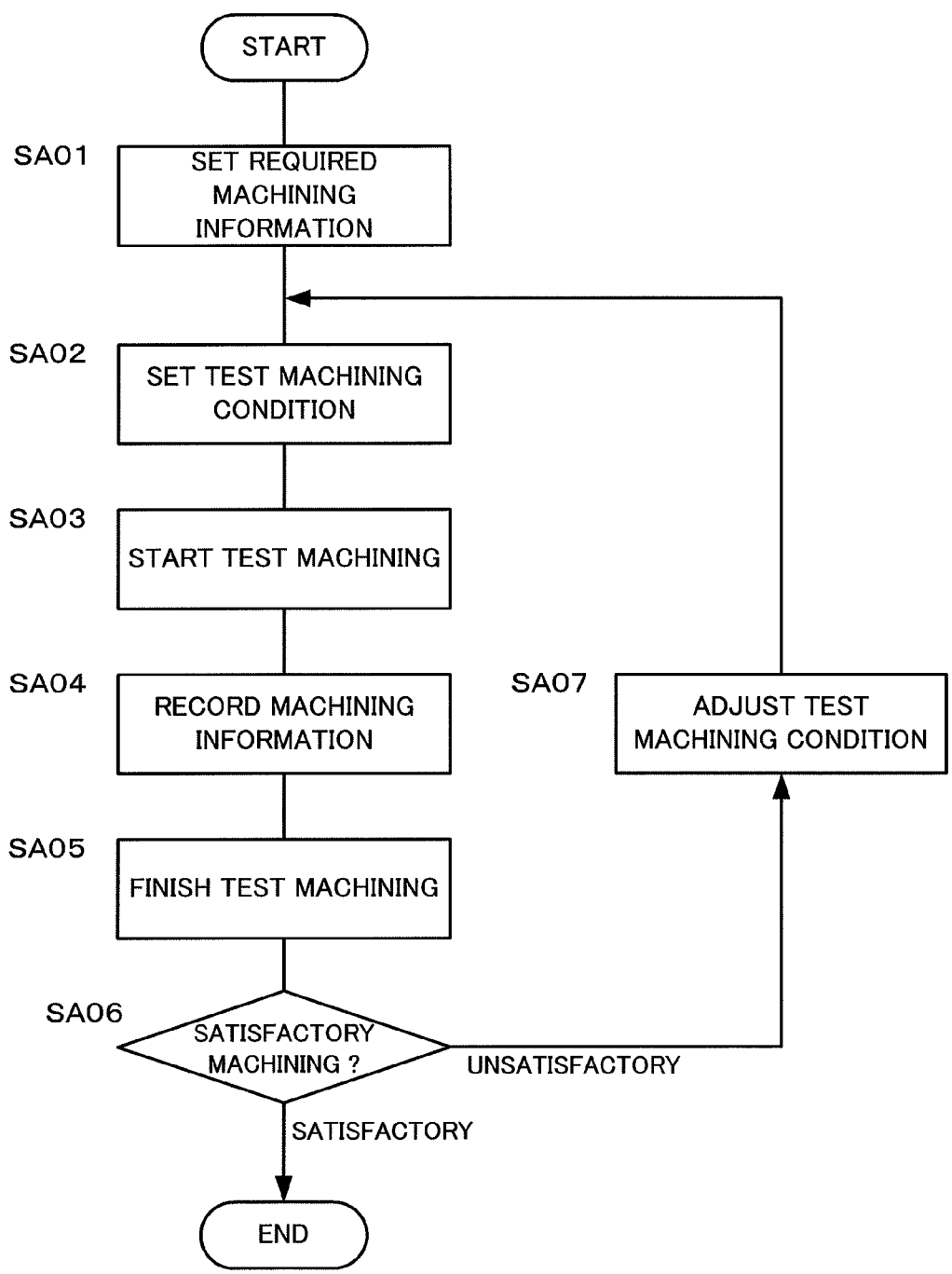
FIG. 13 is a flowchart illustrating a conventional determination process for the machining condition.
Figure 14:
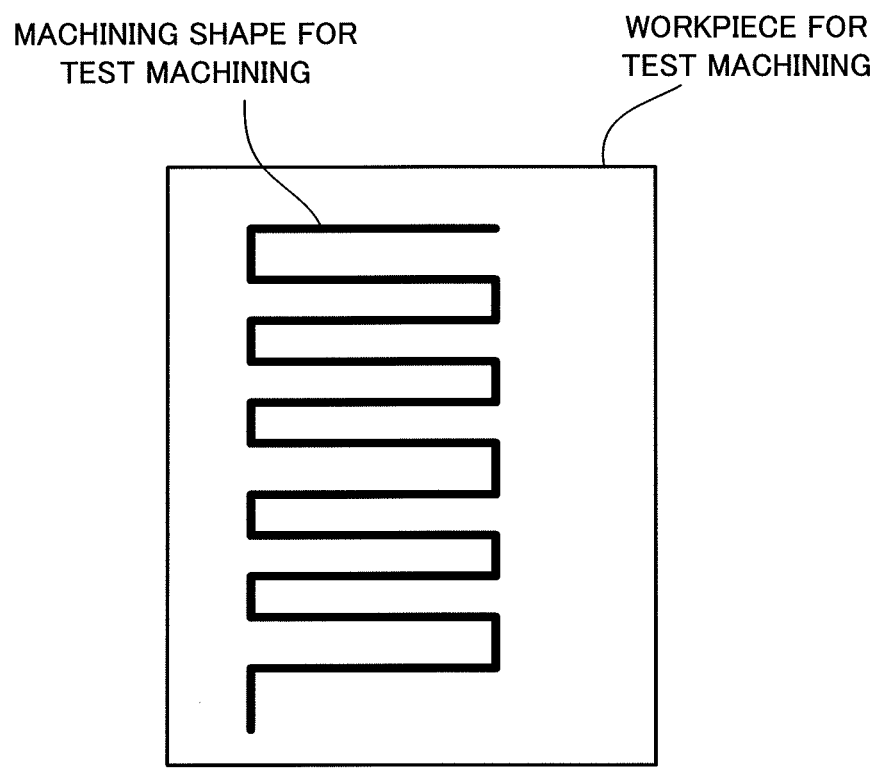
FIG. 14 is a diagram illustrating a machining shape (zigzag shape) for test machining.

FIG. 12 is a block diagram illustrating one embodiment of the machining condition adjusting device for an electric discharge machine according to the present invention.

A required machining state storage unit 18 is loaded with a machining state required for making a test machining satisfactory. A machining condition adjustment method storage unit 12 stores a machining condition adjustment method for the case where unsatisfactory machining is caused during test machining. A machining state information acquiring unit 22 acquires a plurality of signals or physical quantities for determining whether the machining state is satisfactory or not, as machining state information during test machining, for each predetermined period. A machining state determination unit 20 compares the machining state during machining acquired by the machining state information acquiring unit 22 with the machining state required for making a test machining satisfactory, thereby determining whether the test machining is satisfactory or not. A machining condition adjustment unit 14 adjusts the machining condition for test machining so that the machining state during machining agrees with the machining state required for making a test machining satisfactory, based on the machining condition adjustment method, if unsatisfactory machining is determined by the machining state determination unit 20.

The acquisition of the machining state during machining by the machining state information acquiring unit 22, comparison of the machining state during machining with the required machining state and determination as to whether the test machining is satisfactory or not by the machining state determination unit 20, and adjustment of the machining condition for test machining by the machining condition adjustment unit 14 are repeatedly performed so that satisfactory machining is determined by the machining state determination unit 20.

The required machining state storage unit 18 is previously stored with the machining state required for test machining, such as the occurrence or non-occurrence of disconnection, target machining speed, etc., by an operator. The machining condition adjustment method storage unit 12 is previously stored with the machining condition adjustment method for the case where unsatisfactory machining is caused during test machining by the operator. The machining condition adjustment method is represented by the priority of the set items of the machining condition to be adjusted for each machining state indicative of unsatisfactory machining. Further, the priority can be arbitrarily changed, and the type of the machining state indicative of unsatisfactory machining and the set items of the machining condition to be adjusted can be arbitrarily added. Thus, satisfactory machining can be achieved on each occasion by appropriately selecting adjustment methods corresponding to various required machining states.

When test machining by an electric discharge machine 16 is started, the machining state information acquiring unit 22 continues to acquire the machining state during machining until the end of the test machining. If the machining state required for making a test machining satisfactory agrees with the machining state during machining acquired by the information acquiring unit 22 or is within a certain tolerance, the machining state determination unit 20 determines the machining to be satisfactory. If not, the determination unit 20 determines the machining to be unsatisfactory.

If the machining state determination unit 20 indicates unsatisfactory test machining, the values of the set items of the machining condition are adjusted so that the machining state during machining agrees with the required machining state or is within the certain tolerance, based on the machining condition adjustment method. The test machining is continued using the adjusted machining condition. An optimum machining condition can be obtained by repeating the machining condition adjustment in this manner.

The machining condition adjustment method storage unit 12 may alternatively be configured so as to allow addition of the type of the machining state and the set items of the machining condition to be adjusted. Alternatively, moreover, the storage unit 12 may be configured to allow change of the priority of the type of unsatisfactory machining to adjust the machining condition for canceling the unsatisfactory machining, the priority of the set items of the machining condition to be adjusted according to the type of the unsatisfactory machining, and the adjusted values of the set items.

While the machining condition adjusting device for an electric discharge machine according to the present invention has been described as an external device independent of a discharge device, the same effect can also be achieved by mounting the machining condition adjusting device on the discharge device.

According to the machining condition adjusting device for an electric discharge machine of the present invention, the best machining condition can be achieved by determining whether the machining is satisfactory or not by the machining state obtained from the electric discharge machine during test machining, adjusting the machining condition in case of unsatisfactory machining, based on the determination as to whether the machining is satisfactory or not and the machining state, and automatically repeating the test machining by the electric discharge machine so that the machining becomes satisfactory, based on the adjusted machining condition.

According to the machining condition adjusting device for an electric discharge machine of the present invention, moreover, the machining condition can be automatically adjusted. Since one optimum machining condition can be settled, optimum machining can be achieved with a reproducible result by using this machining condition. Since the machining condition adjustment method can be changed, moreover, a novel adjustment method for satisfactory machining, if any, can be easily used for this purpose.

The invention claimed is:

1. A machining condition adjusting device for an electric discharge machine configured to machine a workpiece according to a set machining condition, comprising:
   a machining state information acquiring unit configured to acquire a plurality of signals or physical quantities for determining whether a machining state is satisfactory or not, as machining state information, for each predetermined period;
   a required machining state storage unit configured to store reference values of the signals or physical quantities as reference machining state information;
   a machining state determination unit configured to compare the machining state information acquired by the machining state information acquiring unit with the reference machining state information stored by the required machining state storage unit, thereby determining whether the machining state is satisfactory or not, and to determine the type of unsatisfactory machining if the machining state is determined to be unsatisfactory;
   a machining condition adjustment method storage unit stored with, as a method of adjusting the machining condition to be performed to cancel the unsatisfactory machining if the machining state is determined to be unsatisfactory by the machining state determination unit, priority of the type of the unsatisfactory machining to be subjected to the machining condition adjustment, priority of set items of the machining condition to be adjusted according to the type of the unsatisfactory machining, and adjusted values of the set items; and
   a machining condition adjustment unit configured to adjust the set items of the machining condition based on the machining condition adjustment method if the unsatisfactory machining is determined by the machining state determination unit,
   wherein the machining condition is adjusted by changing the set items to be adjusted according to the priority of the set items if the same unsatisfactory machining is determined again by the machining state determination unit when machining is performed after the machining condition adjustment, and the acquisition of the information by the machining state information acquiring unit, determination by the machining state determination unit, and adjustment by the machining condition adjustment unit are repeatedly performed so that satisfactory machining is determined by the machining state determination unit.

2. The machining condition adjusting device for an electric discharge machine according to claim 1, wherein the machining condition adjustment method storage unit is configured to allow addition of the type of unsatisfactory machining and the set items of the machining condition to be adjusted.

3. The machining condition adjusting device for an electric discharge machine according to claim 1, wherein the machining condition adjustment method storage unit is configured to allow change of the priority of the type of unsatisfactory machining to adjust the machining condition for canceling the unsatisfactory machining, the priority of the set items of the machining condition to be adjusted according to the type of the unsatisfactory machining, and the adjusted values of the set items.

* * * * *